United States Patent [19]

Inhofer et al.

[11] 4,240,990
[45] Dec. 23, 1980

[54] AERATION PROPELLER AND APPARATUS

[75] Inventors: Harold G. Inhofer, Hopkins; John E. De Veau, Minnetonka, both of Minn.

[73] Assignee: Aeration Industries, Inc., Chaska, Minn.

[21] Appl. No.: 30,949

[22] PCT Filed: Apr. 10, 1979

[86] PCT No.: PCT/US79/00224

§ 371 Date: Apr. 10, 1979

§ 102(e) Date: Apr. 10, 1979

[87] PCT Pub. No.: WO79/00958

PCT Pub. Date: Nov. 15, 1979

[51] Int. Cl.$^3$ ............................................. B01F 3/04
[52] U.S. Cl. ................................. 261/87; 210/219; 210/220; 261/93; 366/102; 415/8
[58] Field of Search ............... 261/87, 93, 120, 36 R, 261/83; 210/219, 220, 169, 242 A; 415/8, 102; 115/17; 209/169, 170; 366/102, 147; 417/367, 424

[56] References Cited

U.S. PATENT DOCUMENTS

| | | | |
|---|---|---|---|
| 1,450,326 | 4/1923 | Maitland | 366/102 |
| 1,505,479 | 4/1924 | Maitland | 366/147 |
| 1,745,412 | 2/1930 | Fletcher | 261/93 |
| 1,765,338 | 6/1930 | Jones et al. | 210/220 X |
| 2,061,564 | 11/1936 | Drake et al. | 261/93 |
| 2,063,301 | 12/1936 | Durdin | 261/83 |
| 2,082,759 | 6/1937 | Walker | 261/93 X |
| 2,116,023 | 5/1938 | Gwidt | 261/87 |
| 2,194,037 | 3/1940 | Thuma | 261/36 R |
| 2,232,388 | 2/1941 | Ingalls et al. | 209/169 |
| 2,313,654 | 3/1943 | MacLean | 261/93 |
| 2,433,592 | 12/1947 | Booth | 261/93 |
| 2,515,538 | 7/1950 | Wall | 210/169 |
| 2,609,097 | 9/1952 | Dering | 209/169 |
| 2,641,455 | 6/1953 | Poirot | 261/87 X |
| 2,730,493 | 1/1956 | Carlson | 261/93 X |
| 2,767,965 | 10/1956 | Daman | 261/87 |
| 2,928,665 | 3/1960 | Epprecht | 261/87 |
| 2,944,802 | 7/1960 | Daman | 261/87 |
| 3,053,390 | 9/1962 | Wood | 261/93 X |
| 3,092,678 | 6/1963 | Braun | 261/87 X |
| 3,108,146 | 10/1963 | Gross | 261/87 X |
| 3,140,255 | 7/1964 | Daman | 209/169 |
| 3,465,706 | 9/1969 | Gwidt | 415/8 X |
| 3,497,185 | 2/1970 | Dively | 261/120 X |
| 3,512,762 | 5/1970 | Umbricht | 261/87 |
| 3,584,840 | 6/1971 | Fuchs | 261/87 X |
| 3,778,233 | 12/1973 | Blough et al. | 261/87 X |
| 3,975,469 | 8/1976 | Fuchs | 261/87 |
| 4,045,522 | 8/1977 | Nafziger | 261/93 |

FOREIGN PATENT DOCUMENTS

776656 10/1933 France .

*Primary Examiner*—Richard L. Chiesa
*Attorney, Agent, or Firm*—Merchant, Gould, Smith, Edell, Welter & Schmidt

[57] ABSTRACT

An apparatus (10, 212) for mixing a gas and a liquid is disclosed. The apparatus is comprised of a hollow outer housing (22) and a hollow inner tube (24) received for rotary motion within the outer housing (22). A motor (61) is attached to the outer housing (22) adjacent a first end thereof and is drivingly coupled to a first end of the inner tube (24). The inner tube (24) has a support tube (214) which extends beyond the second end of the outer housing (22). Propeller blades (216) are attached to the support tube (214) for rotation therewith. An inlet (82) is formed in the inner tube (24) for admitting a gas to the hollow interior of the inner tube (24). The support tube (214) has a diffusion section (222) that extends below the propeller blades (216).

The propeller mechanism (210), which includes the support tube (214) and the blades (216), is designed to increase the oxygen transfer efficiency of the apparatus (10, 212) over that provided by a standard marine propeller (48). Each propeller blade (216) has an impelling surface (232) with a varying rake which changes to a more positive rake from a leading end (226) to a tail end (228) of each propeller blade (216). Plates (238, 240, 242) are attached to the air outlet end (224) of the support tube (214). Lower portions (250) of the plates (240, 242) are bent backward in the direction in which the propeller mechanism (210) is to be rotated.

30 Claims, 21 Drawing Figures

AERATION PROPELLER AND APPARATUS

TECHNICAL FIELD

The present invention relates broadly to a propeller mechanism and apparatus for mixing a gas with a liquid. More particularly, the present invention relates to a propeller mechanism and apparatus for aerating water in a water treatment process. The present invention can be used in municipal and private water treatment facilities.

BACKGROUND OF THE PRIOR ART

Aeration apparatus are utilized in the treatment of water for the purpose of increasing the dissolved oxygen (DO) content of the water. A certain amount of dissolved oxygen is required for the life of fish and other aquatic organisms. Dissolved oxygen is also required to prevent the formation of offensive odors and to break down organic matter in water. The biochemical oxygen demand (BOD) is the measure of the amount of oxygen consumed in the biological processes which break down organic matter in water. A high BOD indicates that large amounts of organic waste are present and will use up large amounts of dissolved oxygen. Aeration apparatus are especially useful in increasing the amount of dissolved oxygen and, hence, are useful in high-BOD situations.

Aerators utilized in waste water treatment can be broadly classified into two types: a diffused air type, and a mechanical type. A diffused air type aerator introduces air or pure oxygen into water via submerged porous diffusers or nozzles. Mechanical type aerators agitate the water so as to promote solution of air from the atmosphere.

Mechanical type aerators are further classified as either surface aerators or turbine aerators. A surface aerator utilizes a submerged or partially submerged impeller which agitates the water vigorously to thereby entrain air in the water and cause a rapid change in the air-water interface. Turbine aerators generally utilize a rotating impeller which is disposed a certain distance below the surface of the water being treated. A draft tube is supported generally coaxial with the axis of rotation of the impeller and is utilized to supply air to the liquid adjacent the impeller.

In U.S. Pat. No. 3,465,706 to Gwidt, an apparatus for injecting air into the underwater exhaust of outboard motors is disclosed. Air is injected into water through a hollow propeller tube upon which a marine-type propeller is attached. A diffuser assembly comprised of a air of U-shaped and crossed plates is attached at the outlet end of the propeller tube. The air outlet end is disposed relatively close to the marine prop and the diffuser plates have a relatively narrow width. A round disc is attached to this lower end of the plates. The round disc would apparently inhibit axial flow of water and air bubbles.

SUMMARY OF THE INVENTION

One embodiment of the present invention is directed to a non-fouling propeller mechanism for use with an aeration apparatus. The propeller mechanism is comprised of a support tube and a plurality of propeller blades attached thereto. The support tube is adapted to be attached to an end of a rotatable tube of an aeration apparatus. The propeller blades are attached to the outer surface of the support tube. Each propeller blade has a leading end, a tail end, an outer edge and an impelling surface. The outer edge at the leading end extends outwardly from the outer surface of the support tube at an angle less than 90°. The impelling surface is adapted to move into a liquid in which the support tube is rotated. That is, the impelling surface faces in the direction of rotation. The impelling surface has a varying rake that changes to a more positive rake from the leading end to the tail end.

The support tube preferably has a diffusion section which extends below the lowermost extent of the propeller blades a sufficient distance such that air bubbles which are injected from an open air outlet end of the support tube do not intermix with the water through which the propeller blades are rotated when the support tube is held at an acute angle relative to the horizontal.

A plurality of plate members are attached to the support tube adjacent its air outlet end and extend a distance below the air outlet end for breaking up air bubbles exiting the air outlet end and for causing a radial flow thereof. The plate members are preferably comprised of a plurality of plates extending in a plurality of planes. At least one of the plates has a lowermost section which is bent backward in the direction of rotation of the propeller member so as to permit or reestablish an axial flow of the gas bubbles and water at the lowermost end of the plate members. The axial flow is reestablished after the portion of the plate members above this lowermost section have established a radial flow.

The present invention is also directed to an improvement of the apparatus as disclosed in U.S. patent application Ser. No. 898,983 of Daniel J. Durda on an "Apparatus for Mixing a Gas and a Liquid", which is assigned to the same assignee as the present invention. The apparatus is comprised of a hollow outer housing and a hollow inner tube received within the outer housing. The inner tube is mounted for rotary motion within the hollow interior of the outer housing. A motor is attached to the outer housing adjacent a first end thereof and is drivingly coupled to a first end of the inner tube. The inner tube includes a support tube which extends beyond the second end of the outer housing. An inlet is formed in the inner tube for admitting a gas to the hollow interior of the inner tube. A plurality of propeller blades are attached to the support tube to form a propeller mechanism. The propeller mechanism is adapted to be placed in a liquid and to propel the liquid in which the propeller mechanism rotates. The propeller blades have a maximum transverse dimension in a plane passing through the propeller blades and generally perpendicular through the axis of the support tube. Each propeller blade has a leading end, a tail end, and outer edge and an impelling surface facing in the direction in which the inner tube is rotated. The outer edge at the leading end extends outwardly from the outer surface of the support tube at an angle less than 90°. The impelling surface has a varying rake which changes to a more positive rake from the leading end to the tail end. The support tube has a diffusion section which extends below the lowermost extent of the propeller blades and an open air outlet end which forms the second end of the inner tube. The diffusion section extends a predetermined distance below the propeller blades such that the propeller blades can rotate through a liquid substantially free of gas bubbles injected into the liquid through the air outlet end when the axis of the inner tube is disposed at an acute angle relative to the horizontal.

The propeller mechanism also preferably includes a plurality of plate members comprised of a plurality of plates for causing the breaking up of air bubbles exiting the air outlet end and for causing a radial flow thereof. The plate members also cause a low pressure area in the area of the water in which they rotate. Such a low pressure area also increases the injection rate of the air into the water. A lower section of at least one of the plates is bent backward from the direction of rotation of the inner tube so as to permit or reestablish an axial flow of gas bubbles and water.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

DETAILED DESCRIPTION OF THE INVENTION

Figures 1, 5, 6, 7:
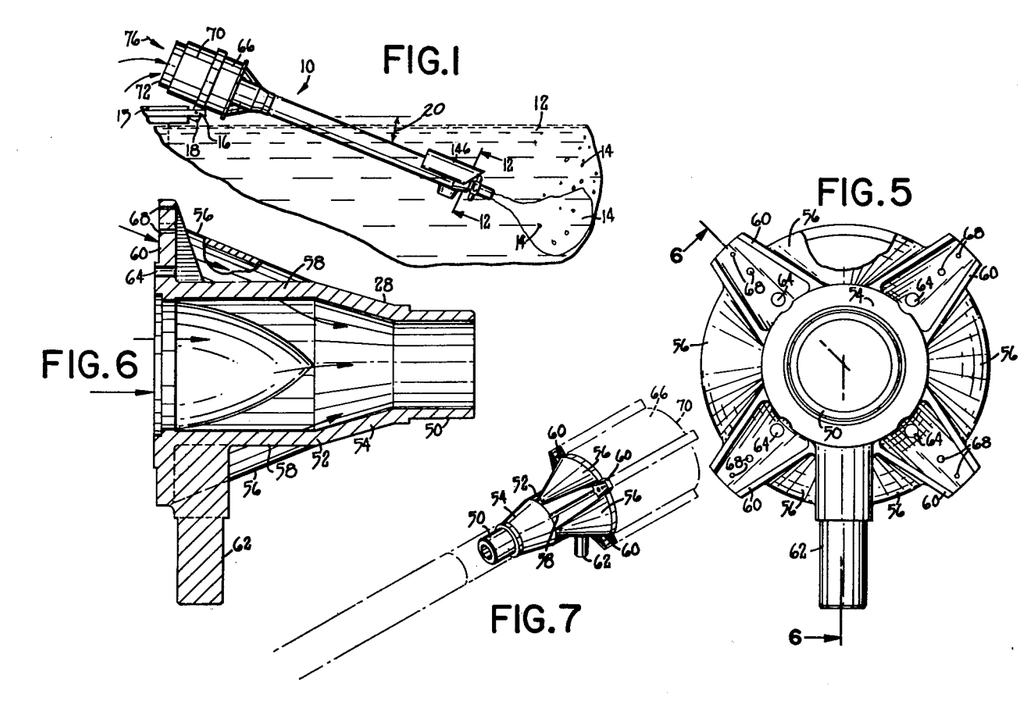
FIG. 1 is a side elevational view illustrating an apparatus in accordance with the present invention disposed within a liquid.
FIG. 5 is an end elevational view of a motor adapter.
FIG. 6 is a view taken along lines 6—6 of FIG. 5.
FIG. 7 is a perspective view illustrating the motor adaptor connected to the outer tube.

Referring to the drawings in detail, wherein like numerals indicate like elements, there is shown in FIG. 1 an apparatus in accordance with the present invention designated generally as 10. The apparatus 10 as shown in FIG. 1 is disposed within a liquid 12. The liquid 12 is generally waste water or sewage to which oxygen must be injected. A gas, generally ambient air, is shown entering the liquid 12 as a plurality of bubbles 14. The apparatus 10 is designed to be portable and is shown supported on a platform 15 by means of a suitable fastener 16 which is attached to an arm 18 extending from the apparatus 10. The apparatus 10 is shown supported in the liquid 12 at an angle 20 relative to the horizontal. The angle 20 is between the horizontal and the vertical. An angle of approximately 22° below horizontal has been found especially efficient for use in the treatment of shallow lagoons.

The apparatus 10 includes an outer tube means or housing 22 and an inner tube means 24. The outer housing 22 is comprised of a central tube 26, a motor adaptor 28 attached to a first or upper end of the central tube 26, and a bearing housing 30 attached to a second or lower end of the central tube 26. The inner tube means 24 includes a longitudinally extending tube 32, a propeller tube 34, and a diffusion tube 36.

Figures 2, 3:
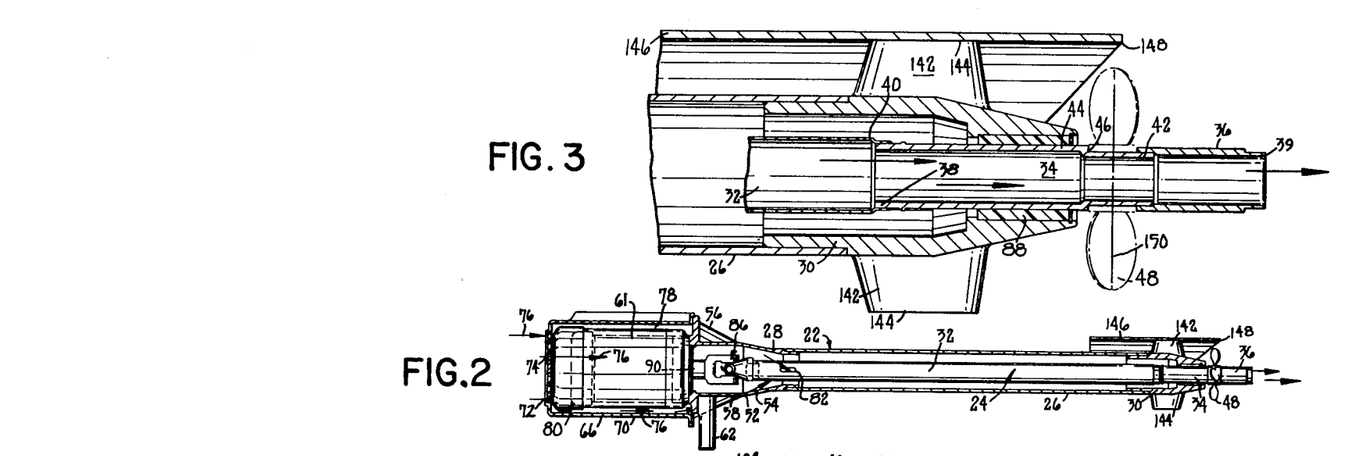
FIG. 2 is a partial side elevational and partial sectional view of the apparatus.
FIG. 3 is a sectional view of the lower end of the apparatus on an enlarged scale.

The propeller tube 34 has a first end 38 whose outer diameter is less than the inner diameter of an end 40 of the tube 32. The end 38 thus can be received within the tube 32 and secured thereto by suitable means such as welding. The propeller tube 34 has a second end 42. As best seen in FIG. 3, the second end 42 has an outer diameter which is less than the outer diameter of a medial section 44 of the propeller tube 34. A shoulder 46 is thus formed at the juncture between the second end 42 and the medial section 44. A propeller 48 can thus be received about the second end 42 and abut against the shoulder 46. The lowermost portion of the second end 42 has a threaded exterior. The interior of one end of the diffusion tube 36 is threaded to mate with the threads of the diffusion tube 36. The propeller 48 can thereby be held on the propeller tube 34 by threading the diffusion tube 36 onto the propeller tube 34 so that the propeller 48 is frictionally engaged between the shoulder 46 and the diffusion tube 36.

The motor adaptor 28 includes a cylindrical section 50 and a truncated cone section 52. The truncated cone section 52 is divided into a first section 54 and a second section 56. A plurality of ribs 58 are formed in the second section 56. A plurality of support arms 60 extend radially outward from the ribs 58. A handle 62 also extends outwardly from the motor adaptor 28. The handle 62 is used as a grip to either carry or adjust the position of the apparatus 10.

A motor 61 is secured to the innermost holes 64 in the arms 60. A casing or housing 66 is attached to the outer holes 68 in the arm 60. The housing 66 includes a circumferential wall 70 which completely encircles the motor 61 and a top wall 72. The top wall 72 has a plurality of holes or slots 74. The slots or holes 74 provide an air inlet for air to be drawn into the interior of the housing 66. The housing 66 forms a plenum 78 around the motor 61. The motor 61 has a fan section 80 which includes a fan for drawing air across the outer surface of the motor 61 in order to keep the motor 61 cool. The movement of the air into and through the plenum 78 is illustrated by arrows 76.

Figure 4:
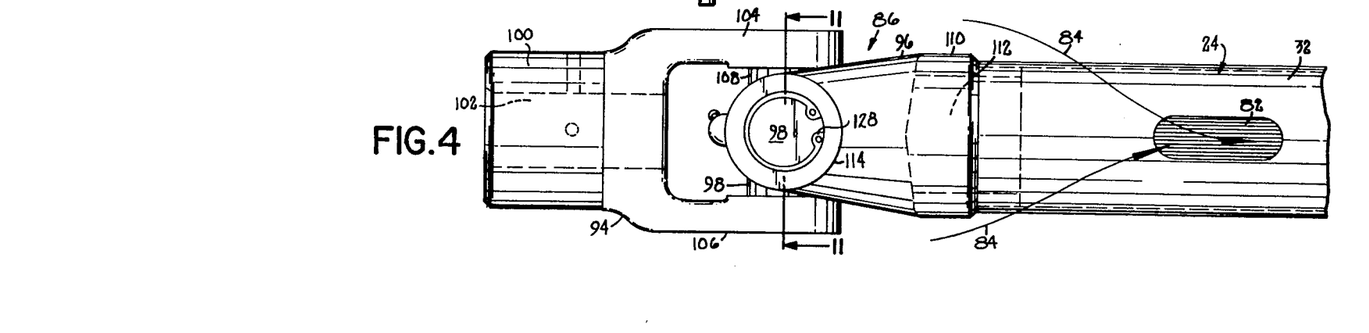
FIG. 4 is a view illustrating a U-joint attached to an end of the inner tube on an enlarged scale.

Air as it passes through the plenum 78 is heated by the motor 61. The air passes through the plenum 78 to the hollow interior of the motor adaptor 28. The motor adaptor 28 also forms an enclosed plenum so that the air is confined to move down the hollow interior of the outer tube means 22. Inlet means, such as air inlet slots 82, are formed in the tube 32 adjacent its first or upper end. As shown by arrows 84, the heated air which is moving down the hollow interior of the outer tube means 22 passes into the hollow interior of the inner tube means 24 via the air inlet slots 82. Only one air inlet slot 82 is shown in FIGS. 2 and 4, however, preferably at least two air inlet slots 82 are formed in the tube 32. As will be explained more fully hereinafter, the heated air thereafter passes downwardly through the tube 32 and out the open end of the diffusion tube 36.

The inner tube means 24 is supported within the outer tube means 22 at one of its ends by a flexible coupling, such as a U-joint 86. The other end of the inner tube means 24 is supported in a water bearing 88 which is secured within the bearing housing 30. The U-joint 86 couples one end of the tube 32 to a rotary-driven drive shaft 90 of the motor 61, while the water bearing 88 permits the rotation of the entire inner tube means 24. The axis of the inner tube means 24 is shown as arrow 92.

Figures 8, 9, 10, 11, 12:
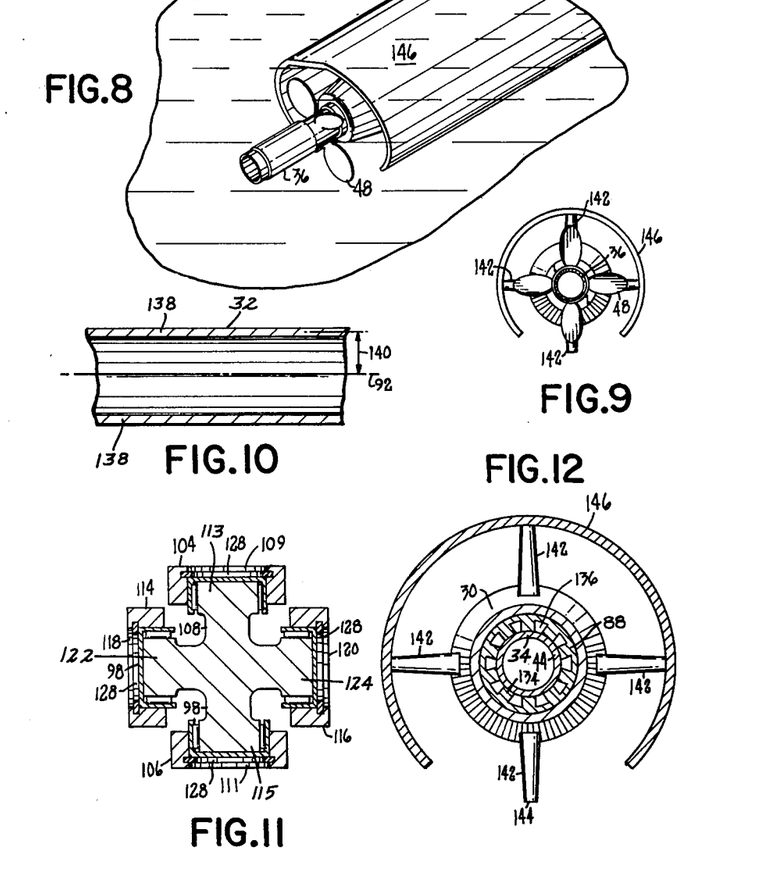
FIG. 8 is a perspective view illustrating the lower end of the apparatus.
FIG. 9 is a plan view of the lower end of the apparatus.
FIG. 10 is a fragmentary cross-sectional view of the inner and outer tubes of the apparatus.
FIG. 11 is a cross-sectional view taken along lines 11—11 of FIG. 4.
FIG. 12 is a cross-sectional view taken along lines 12—12 of FIG. 1.

The U-joint 86 includes an upper yoke 94 coupled to a lower yoke 96 by means of a crosshead 98. The upper yoke 94 has a head section 100 with a central bore 102 extending therein. The drive shaft 90 of the motor 61 is secured within the bore 102 to transmit the rotary motion of the drive shaft 90 to the U-joint 86. The upper yoke 94 also includes a pair of opposing arms 104, 106. The arm 104 has a hole 109 extending through it and the arm 106 has a hole 111 extending through it. The crosshead 98 includes a first fin 108 with opposite ends 113, 115. The end 113 is pivotably supported in the hole 109 and the end 115 is pivotably supported in the hole 111. The lower yoke 96 has a head section 110 with a bore 112 extending therein. The upper end of the tube 32 is secured within the bore 112 so that the rotation of the yoke 86 is transmitted to the tube 32. The yoke 96 also includes a pair of opposing arms 114, 116. The arm 114 has a hole 118 extending through it and the arm 116 has a hole 120 extending through it. The crosshead 98 includes a second pin 126 with opposite ends 122, 124. The end 122 is pivotably supported in the hole 118 and the end 124 is pivotably supported in the hole 120. Clips 128 hold the ends 113, 115, 122, 124 in the respective holes 109, 111, 118, 120. The lower yoke 96 and the upper end of the tube 32 attached thereto are thus capable of pivoting about transverse axes 130, 132 of the pins 108, 126. The U-joint 86 permits universal motion of the first or upper end of the tube 32 while transmitting rotary motion from the drive shaft 90 to the tube 32.

As best seen in FIG. 12, the water bearing 88 includes a plurality of bearing bars 134 extending along its length. The bearing bars 134 are so disposed that a gap 136 exists between adjacent bars 134. When the water bearing 88 is placed in a liquid such as water, the water is permitted to flow in the gaps 136 and also between the outer circumference of the propeller tube 34 and the bars 134. Water thus acts as a lubricant between the propeller tube 34 and the bearing 88.

The tube 32 is mechanically straightened to exact tolerances. The tube 32 is straightened so that the cylindrical wall 138 of the tube 32 is aligned about the axis 92 a certain distance 140 to a tolerance of better than fifteen thousandths of an inch. That is, the distance 140 is the same throughout the entire length of the tube 32 to a tolerance better than fifteen thousandths of an inch. Applicant has discovered that when the tube 32 is straightened to a tolerance of only fifteen thousandths of an inch, vibration and whipping of the tube 32 occurs such that early breakage of the tube 32 results. Applicant has discovered that straightening the tube 32 to a tolerance of ten thousandths of an inch, that is, dynamically balancing the shaft to one ounce-inch at 3,450 r.p.m., essentially eliminates the problem of vibration of the tube 32. Applicant, however, believes that straightening the tube 32 to a tolerance better than fifteen thousandths of an inch would also essentially eliminate or alleviate the problem of vibration. The use of a flexible coupling, such as U-joint 86, together with the above critical tolerances, further aids in eliminating vibration. The problem of vibration in aeration apparatus of the type disclosed herein results in shearing or breaking of an inner tube means after only a relatively short period of operation.

A plurality of fins 142 extend radially outward from the bearing housing 30. Each fin 142 has a distal end 144. A vortex shield 146 is attached to a number of the distal ends 144. The shield 146 has a lengthwise dimension extending generally parallel to the axis 92 and a circumferential dimension extending in an arc less than 360°. As best seen in FIG. 8, the shield 146 has a lower end 148 in a generally truncated-V configuration. A portion of the lower end 148 extends above the propeller 48. The shield prevents the formation of a vortex adjacent the propeller in the liquid in which the propeller is driven. Without the shield 146, a vortex of liquid may form at the propeller and, hence, decrease the efficiency at which the propeller moves the liquid.

The apparatus 10 operates in the following manner. The apparatus 10 is disposed in a liquid 12 at an angle 20 relative to the horizontal. The liquid 12 is generally sewage or waste water which contains organic material and which requires a high level of dissolved oxygen. The motor 61 is driven preferably by an electrical source (not shown). The drive shaft 90 of the motor 61 is thereby rotated and the rotary motion is transferred to the inner tube means 24. The propeller 48 rotates in the liquid 12 and propels the liquid 12 by the open end of the diffusion tube 36 creates a venturi or suction effect which draws air down through the hollow interior of the inner tube means 24. The air which is drawn through the hollow interior of the inner tube means 24 was preheated while passing through the plenum 78. The preheating of the air is desirable when the apparatus 10 is used as an aerator in bodies of water in northern climes wherein the body of water generally freezes over in the winter. By utilizing the preheated air, at least a portion of the body of water can be kept unfrozen or open. The unfrozen portion of the water thus provides a contact surface with the ambient air wherein the air can dissolve into the water. If the body of water is completely frozen over, such an open air-water contact at the surface of the water is lost.

The diffusion tube 36 has a length which is at least fifty percent of the transverse dimension of the propeller 48. The transverse dimension of the propeller 48 is indicated as line 150 which lies in a plane passing through the propeller and perpendicular to the axis 92. By utilizing a diffusion tube 36 that extends below the propeller by a length of at least fifty percent of the transverse dimension 150 of the propeller 48, the air bubbles 14 are released into the liquid 12 a sufficient distance away from the propeller 48 so that the propeller 48 moves through liquid which does not contain bubbles 14. This increases the efficiency with which the propeller 48 propels the liquid 12. If the diffusion tube 36 were too short, the bubbles 14 would be released too close to the propeller 48 and thereby become intermixed with the liquid through which the propeller 48 was being driven. In such a condition, less liquid would be moved by the end of the diffusion tube 36 and the efficiency of the aeration process would be decreased. A three-inch diffusion tube used with a five-inch propeller has been found satisfactory.

The open end of the diffusion tube 36 has a curved inner circumferential surface 39. See FIG. 3. For reasons unknown, it has been found that the air bubbles 14 disperse over a larger area when the inner circumferential surface of the open end of the diffusion tube 36 is curved than when the inner circumferential area is straight. It has been found that while the curved surface 39 of the diffusion tube 36 increases the dispersion of air bubbles when the marine propeller 48 is used, such a curved surface does not aid the operation of the aeration apparatus when the propeller mechanism illustrated in FIGS. 13-20 is used. As mentioned above, the shield 146 prevents the formation of a vortex of liquid at the propeller 48 and, hence, also increases the efficiency of the apparatus. When the apparatus 10 is disposed at an angle 20 within the liquid 12 the liquid 12 moved by the propeller 48 also aids in dispersing the air bubbles 14 over a large area in the liquid 12.

Figure 13:
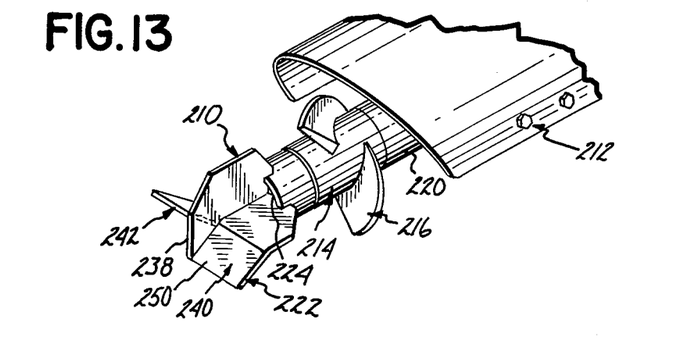
FIG. 13 is a perspective view illustrating a prop mechanism in accordance with the present invention attached to an aeration apparatus.
Figure 14:
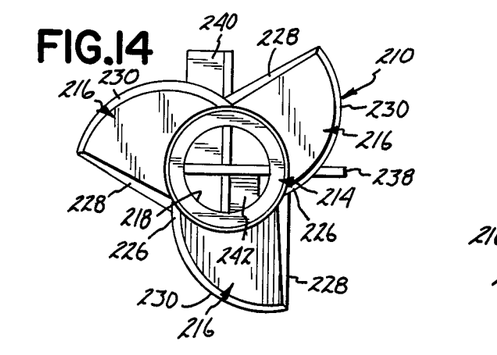
FIG. 14 is a top plan view of the propeller mechanism itself.

There is shown in FIGS. 13-19 a propeller mechanism 210 in accordance with the present invention. The propeller mechanism 210 is shown in FIG. 13 attached to a portion of an aeration apparatus 212. Only a portion of the apparatus 212 is shown in FIG. 13. The structure of the apparatus 212 is the same as the apparatus disclosed in FIGS. 1-12 except for the propeller mechanism.

The propeller mechanism 210 includes a support tube 214 and a plurality of propeller blades 216 attached to the outer surface of the tube 214. The support tube 214 has an inlet end 218 which is attached in any suitable manner to an end of an inner tube 220 of the aeration apparatus 212. The support tube 214 has a diffusion section 222 which extends below the lowermost extent of the propeller blades 216. The support tube 214 also has an open air outlet end 224 through which gas or air can be injected into the liquid in which the propeller mechanism 210 is disposed. As with the diffusion tube 36, the diffusion section 222 extends a sufficient distance below the propeller blades 216 such that air ejected from the air outlet end 224 does not intermix with the liquid through which the propeller blades 216 are rotated when the axis of the inner tube 220 is disposed at an acute angle relative to the horizontal, for example at approximately 25°.

Each propeller blade 216 has a lead end 226, a tail end 228, an outer edge 230 and an impelling surface 232. The outer edge 230 extends outward from the outer surface of the support tube 214 at the lead end 226 at an angle less than 90°, and preferably less than 45°. By having the outer edge 230 extend from the support tube 214 at such an angle, fouling of the propeller mechanism 210 is prevented. When a normal marine prop is utilized, flexible solid material, such as rags, tend to become entangled in the prop. Prop blades 216 tend to prevent such fouling under most water treatment conditions.

Figure 17:
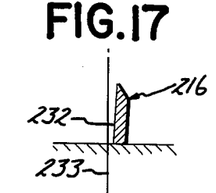
FIGS. 17, 18 and 19 are sectional views taken generally respectively along lines 17—17, 18—18, and 19—19 of FIG. 16 illustrating the varying rake of the propeller blades.
Figure 18:
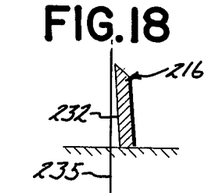
Figure 19:
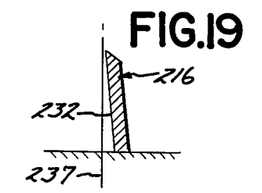
Figure 21:
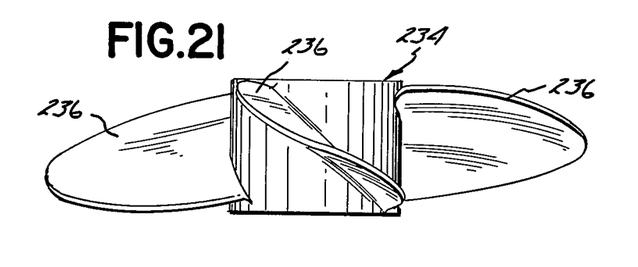
FIG. 21 is a side elevational view illustrating a typical marine prop of the prior art.

Each propeller blade 216 is preferably made of a flat piece of rigid material and one flat major surface of the material forms the impelling surface 232. The impelling surface 232 faces in the direction in which the propeller mechanism 210 is designed to rotate. As seen in FIG. 17, the impelling surface 232 has a slightly negative rake adjacent the lead end 226. That is, the impelling surface 232 is bent slightly back or away from a radius 233 extending from the rotational axis. As seen in FIG. 18, which is a sectional view taken farther along the length of the propeller blade 216, the rake of the impelling surface 232 has changed to a slightly positive rake. That is, the impelling surface 232 is leaning in towards a radius 235 extending from the rotational axis. As seen in FIG. 19, the rake of the impelling surface 232 is even more positive, i.e. the impelling surface 232 is slanted in towards a radius 237 at an even greater angle. While FIGS. 17-19 illustrate the rake going from a negative rake to a positive rake, it should be understood that the rake of the propeller blades 216 need not start at a negative rake, but merely that the rake increase to a more positive rake from the lead end 226 to the tail end 228. In this manner, water is impelled from the impelling surface 232 at various velocities along the length of an impelling surface 232. Thus, while the blades 216 create an axial flow, they create a turbulent axial flow. This is contrary to the purpose and function of a typical marine propeller 234, such as illustrated in FIG. 21. The angle of attack, pitch or rake of propeller blades 236 on typical marine propeller 234, as illustrated in FIG. 21, gradually increases to a more negative rake. The pitch of the blades 236 changes in this manner because even velocities or laminar flow are desired in a typical marine propeller in order to attain maximum thrust. Applicants have found that such uniform velocity or laminar flow is not desirable in an aeration apparatus. While a strong axial flow is desirable for mixing purposes, a more turbulent flow is also preferable. Varying the rake in the positive direction as disclosed above has been found especially useful in increasing the air injection capability of an aeration apparatus.

A plurality of plates 238, 240, 242 are attached to the support tube 214 at its air outlet end 224. The plate 238 is preferably a flat plate which passes generally through a first plane. The second and third plates 240, 242, or at least a portion of each of these plates, passes generally through a second plane transverse or perpendicular to the first plane. In this manner, the plates 238-242 are connected in a crossed manner. The upper end of each plate 238-242 is fitted within a slot 244 formed in the support tube 214. In this manner, the area at which the plates 238-242 cross is disposed within the hollow interior of the support tube 214. The portions of the plates 238-242 which are disposed within the hollow interior of the support tube 214 are thus in an area where only air is present when the aerator is operating. Thus, the fouling of the plates 238-242 at their crossed intersection is prevented. If the area where the plates 238-242 crossed were located at the air-water interface, solid materials would tend to gather at the intersection of the plates 238-242. In order to prevent fouling of the propeller mechanism 210 at the point where the plates 238-242 intersect with the outer surface of the support tube 214, the plates 238-242 have tapered ends 255 that extend from the support tube 214 with a gradually increasing transverse dimension.

Figure 15:
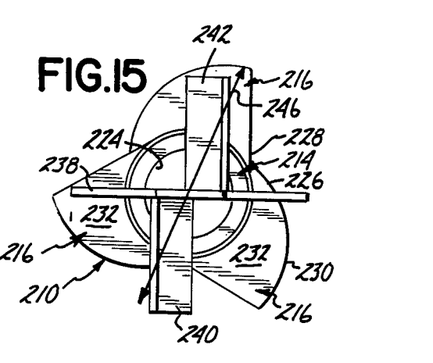
FIG. 15 is a bottom plan view of the propeller mechanism itself.
Figure 16:
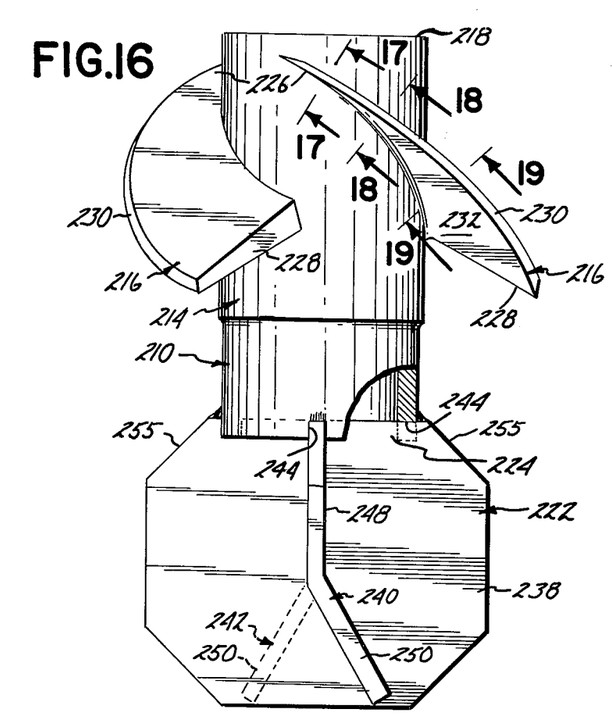
FIG. 16 is a side elevational view on an enlarged scale, with portions broken away, of the propeller mechanism.

As is best seen in FIG. 15 the propeller blades 216 have a maximum transverse dimension indicated by a line 246. The first plate 238, as seen in FIG. 15, has a maximum transverse dimension approximately the same as the maximum transverse dimension of the propeller blades 216. As seen in FIG. 16, the maximum transverse dimension of the plate 238 extends over a large portion of the longitudinal or axial dimension of the plate 238. Similarly, the maximum transverse dimension of the combined second and third plates 240, 242 is also approximate to the maximum transverse dimension of the propeller blades 216. The main function of the plates 238-242 is to increase the amount of air injected into water by the aeration apparatus 212. It has been found that if the maximum transverse dimension of the plates 238-242 is too narrow, i.e. substantially smaller than the transverse dimension of the propeller blades 216, the amount of air injected does not increase appreciably. By increasing the transverse dimension of the plates 238-242, the amount of air injected into the water by apparatus 212 increases. It has been found that an optimum or satisfactory level of air injection to power consumption results when the transverse dimension of the plates 238-242 approximates the transverse dimension of the propeller blades 216.

The entire plate 238 lies in a single plane and an upper portion 248 of the second and third plates 240, 242 lies in a single plane transverse to the plane of the first plate 238. However, a lower portion 250 of each plate 240, 242 is bent backward or away from the direction of rotation of the propeller mechanism 210. As discussed above, the plates 238-242 function to increase the amount of air injected into the water. The propeller mechanism 210 in addition to increasing the amount of air which is injected into the water, also increases the percentage of oxygen which dissolves in the water. Applicants believe that the increase in the amount of dissolved oxygen is caused by the action of the plates 238-242. The plates 238-242 cause the air bubbles which exit the air outlet end 224 to be broken up into fine bubbles and cause the bubbles to flow radially outward. Applicants believe that breaking the bubbles down into smaller air bubbles decreases the reliance upon "hang time" to cause the dissolving of oxygen into the water. Since the bubbles are broken into fine bubbles which have a smaller diameter, the interface area between air and water for a given volume of air is increased and thus dissolving of oxygen occurs more rapidly. The time element which is required for oxygen transfer is reduced. The shortening of this time element is especially useful where the aeration is required in a shallow area in which hang time would be minimal.

The lower bent portions 250 of the blades 240-242 tend to reestablish an axial flow of the air bubbles and water at the lowermost end of the propeller mechanism 210. The reestablishment of the axial flow is desirable so that the mixing of the air bubbles and the inducement of a flow in the water can be optimized. If all of the plates 238-242 were completely flat, too great a radial flow would be established.

Figure 20:
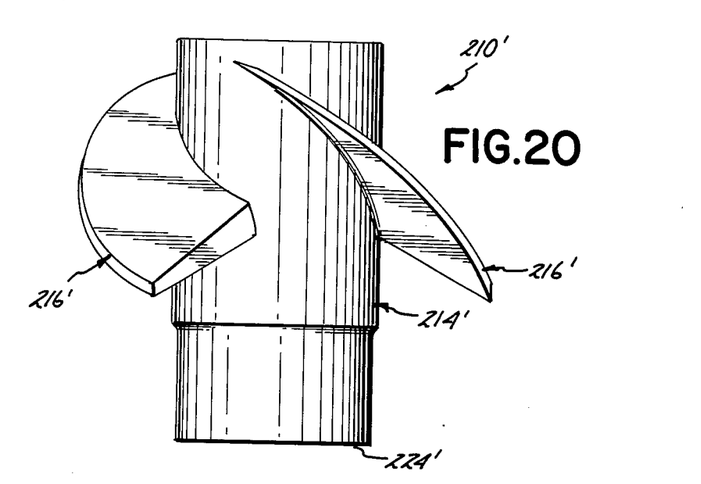
FIG. 20 is a side elevational view of another embodiment of the propeller mechanism in accordance with the present invention.

The prop mechanism 210 thus provides broad versatility in designing a prop mechanism for various water treatment conditions. When the water or sewage being treated requires a high amount of dissolved oxygen, but does not require a large amount of mixing, i.e. in very small ponds, the lower portions 250 can be made relatively small as compared to the remaining portion of the plates 240, 242. The oxygen injection is thus increased, while the axial flow is decreased. Also, the amount of power which is put into air injection is increased over the amount of power that is placed into mixing. On the other hand, where mixing is more important than the amount of oxygen which is to be injected, the length of the lower portion 250 can be increased so that more axial flow for mixing is utilized.

Where the requirement for dissolved is not high and the requirement for mixing is, the alternate embodiment shown in FIG. 20 can be utilized. There is illustrated in FIG. 20 an alternate embodiment of a propeller mechanism, designated generally as 210'. The propeller mechanism 210' is comprised of a support hub 214' and a plurality of propeller blades 216' attached to the outer surface thereof. The propeller blades 216' are constructed the same as the propeller blades 216. The propeller mechanism 210' does not utilize any plates at its air outlet end 224' to cause a radial flow of gas bubbles and water. Even though no plates are utilized, applicants have found that the propeller mechanism 210' results in higher air injection rates than are found in the use of standard marine props. Applicants believe that this is due to the turbulent flow created by the varying rake of the propeller blades 216'.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

What is claimed is:

1. A propeller mechanism for use with an aeration apparatus comprising:
   a support tube extending from an end of a rotatable conduit of an aeration apparatus, said support tube having gas outlet means below said propeller blades;
   a plurality of propeller blades attached to the outer surface of said support tube, each of said propeller blades extending in the axial dimension of said support tube;
   each propeller blade having a leading end, a tail end, an outer edge and an impelling surface, the outer edge at the leading end extending outwardly from the outer surface of said support tube at an angle less than 90°, said impelling surface facing in the direction in which said propeller mechanism is adapted to rotate, said impelling surface having a rake at a given axial position along a respective propeller blade defined by the angle at which the impelling surface is disposed with respect to a radius extending normal from the axis of the support tube, said rake changing to a more positive rake from the axial position at the leading end to the axial position at the tail end.

2. A propeller mechanism in accordance with claim 1 wherein said support tube includes a diffusion section extending a distance below the lowermost extent of said propeller blades and having an open air outlet end whereby air bubbles ejected from said outlet end do not intermix with water through which said propeller blades are rotated.

3. A propeller mechanism in accordance with claim 2 including plate members extending below said air outlet end for breaking up air bubbles exiting said air outlet end and for causing a radial flow thereof, said plate members including a first plate extending generally in a first plane and second and third plates extending generally in a second plane transverse to said first plane.

4. A propeller mechanism in accordance with claim 1, 2 or 3 wherein the rake of each propelller blade is negative at the leading end and changes to a positive rake at the tail end.

5. A propeller mechanism in accordance with claim 3 wherein said first plate has an axial dimension extending generally parallel to the axis of said support tube and a transverse dimension extending generally perpendicular to said axis, said transverse dimension of said first plate along a major portion of said first plate being approximately the same as a transverse dimension extending between the widest extent of said propeller blades.

6. A propeller mechanism in accordance with claim 3 or 5 wherein said second plate extends perpendicularly from one side of said first plate and said third plate extends perpendicularly from a second side of said first plate.

7. A propeller mechanism in accordance with claim 6 wherein said second and third plates each have a lower end spaced from the air outlet end of said support tube, said lower end being angled backward away from the direction in which said propeller mechanism is adapted to be rotated whereby an axial flow of liquid and air bubbles is permitted off said lower end.

8. A propeller mechanism in accordance with claim 3 or 5 wherein said first, second and third plates are attached within slots formed in said support tube at said air outlet end whereby a portion of said first, second and third plates is disposed within the hollow interior of said support tube.

9. A propeller mechanism in accordance with claim 1 wherein each propeller blade has a flat major surface which forms said impelling surface for contacting a liquid in the rotative direction, said flat surface being slanted away from a radius line extending from the axis of said support tube adjacent the leading end of a respective propeller blade and said flat surface slanting toward a radius line extending from the axis of said support tube adjacent the tail end of a respective propeller blade whereby water is driven off of a rotating propeller blade at different velocities at different locations along the length thereof.

10. A non-fouling propeller mechanism for use with an aeration apparatus comprising:
a support tube for attachment to an end of a rotatable air injection tube of an aeration apparatus;
a plurality of propeller blades attached to the outer surface of said support tube;
each propeller blade having a leading end, a tail end, an outer edge, and an impelling surface, the outer edge at the leading end extending outwardly from the outer surface of said support tube at an angle less than 45°, said impelling surface facing the direction in which said propeller mechanism is adapted to rotate, said impelling surface having a rake at a given axial position along a respective propeller blade defined by the angle at which the impelling surface is disposed with respect to a radius extending normal from the axis of the support tube, said rake changing to a more positive rake from the axial position at the leading end to the axial position at the tail end;
said support tube having a diffusion section extending below the lowermost extent of said propeller blades a predetermined distance sufficient that air bubbles ejected from an open outlet end of said support tube do not intermix with the water through which said propeller blades are rotated; and
a plurality of plate members extending below said air outlet end for breaking up air bubbles exiting said air outlet end and for causing radial flow thereof.

11. A propeller mechanism in accordance with claim 10 wherein said plate members include a first plate extending generally in a first plane and having a transverse dimension along a portion thereof approximately the same as the transverse dimension of the widest transverse extent of said propeller blades, a second plate extending generally perpendicularly from a first major face of said first blade, and a third plate extending generally perpendicularly from a second major face of said first plate, said second and third plates having lower ends bent away from the direction in which the propeller mechanism is adapted to rotate.

12. A propeller mechanism in accordance with claim 11 wherein each of said plates is received within a slot formed in said support tube at the air outlet end and wherein each plate has a tapered end extending gradually radially outward from a respective slot.

13. A propeller mechanism in accordance with claim 10 wherein said first plate has a maximum transverse dimension perpendicular to the axis of said support plate approximately the same as the maximum transverse dimension of said prop blades.

14. A propeller mechanism in accordance with claim 10, 11, 12 or 13 wherein the rake of each propeller blade is negative at the leading end and changes to a positive rake at the tail end.

15. A propeller mechanism in accordance with claim 14 wherein each propeller blade is comprised of a flat plate.

16. A propeller mechanism for use with an aeration apparatus comprising:
a support tube for attachement to an end of a rotatable air injection tube of an aeration apparatus;
means for inducing a turbulent axial flow of liquid in which said propeller is rotated, said inducing means including a plurality of propeller blades attached to an outer surface of said support tube and having an impelling surface with a rake at a given axial position along a respective propeller blade defined by the angle at which the impelling surface is disposed with respect to a radius extending normal from the axis of the support tube, said rake changing to a more positive rake from the axial position at the leading end to the axial position at the tail end;
means for injecting air bubbles a sufficient distance below said propeller blades such that said propeller blades rotate in water free of air bubbles when said support tube is held at an acute angle relative to the horizontal, said air injection means including a diffusion section of said support tube extending a predetermined distance below a lowermost extent of said propeller blades and having an open air outlet end;
means for breaking up air bubbles exiting said air outlet end and for causing a radial flow of said air bubbles and water, said last-mentioned means including a plurality of plates extending axially below and radially outward from said support tube; and means for reestablishing an axial flow of air bubbles and water, said last-mentioned means including a lowermost portion of at least one of said blades being bent backward in the direction in which said propeller mechanism is intended to rotate.

17. An apparatus for mixing a gas and a liquid comprising:

an outer housing having a hollow interior, opposite first and second ends, and a longitudinal dimension extending between the ends;

inner tube means for defining an air inlet passage;

said inner tube means being mounted for rotary motion about its axis within the hollow interior of said outer housing;

motor means attached to said outer housing adjacent the first end thereof and drivingly coupled to a first end of said inner tube means for rotating said inner tube means;

said inner tube means including a support tube extending beyond the second end of said outer housing;

a plurality of propeller blades attached to said support tube for rotation therewith, said propeller blades having a maximum transverse dimension in a plane passing through said propeller blades and generally perpendicularly through the axis of said support tube, said propeller blades being adapted to be placed in a liquid and to propel the liquid in which the propeller rotates;

each propeller blade having a leading end, a tail end, an outer edge and an impelling surface facing the direction in which said inner tube means is rotated, the outer edge at the leading end extending outwardly from the outer surface of said support tube at an angle less than 90°, and said impelling surface having a rake at a given axial position along a respective propeller blade defined by the angle at which the impelling surface is disposed with respect to a radius extending normal from the axis of the support tube, said rake changing to a more positive rake from the axial position at the leading end to the axial position at the tail end;

inlet means for admitting a gas to the hollow interior of said inner tube means, said inlet means being formed in said inner tube means; and said support tube having a diffusion section extending below the lowermost extent of said propeller blades, said support tube having an open air outlet end at the second end of said inner tube means for injecting a gas passing through the hollow interior of said inner tube means into a liquid in which the support tube is placed.

18. An apparatus in accordance with claim 17 including plate members extending below said air outlet end for breaking up gas bubbles exiting said air outlet end and for causing a radial flow thereof, said plate members including a first plate extending generally in a first plane and second and third plates extending generally in a second plate transverse to said first plane.

19. An apparatus in accordance with claim 18 wherein said first plate has an axial dimension extending generally parallel to the axis of said support tube and a transverse dimension extending generally perpendicular to said axis, said transverse dimension of said first plate along a major portion of said first plate being approximately the same as the maximum transverse dimension of said propeller blades.

20. An apparatus in accordance with claim 17, 18 or 19 wherein the rake of the impelling surface of each propeller blade is negative at the leading end and changes to a positive rake at the tail end.

21. An apparatus in accordance with claim 18 or 19 wherein said second plate extends perpendicularly from one side of said first plate and said third plate extends perpendicularly from a second side of said first plate.

22. An apparatus in accordance with claim 21 wherein said second and third plates each have a lower end spaced from the air outlet end of said support tube, said lower end being angled backward away from the direction in which said propeller mechanism is adapted to be rotated whereby an axial flow of liquid is permitted off said lower end.

23. An apparatus in accordance with claim 18 or 19 wherein said first, second and third plates are attached within slots formed in said support tube whereby a portion of said first, second and third plates is disposed within the hollow interior of said support tube.

24. An apparatus in accordance with claim 17 wherein each propeller blade has a flat major surface forming said impelling surface for contacting a liquid in the rotative direction, said flat surface being slanted away from a radius line extending from the axis of said support tube adjacent the leading end of a respective propeller blade and said flat surface slanting toward a radius line extending from the axis of support tube adjacent said tail end of a respective propeller blade whereby liquid is driven off of a rotating propeller blade at different velocities at different locations along the length thereof.

25. An apparatus in accordance with claim 24 including a shield attached to an outer surface of the outer tube means adjacent its second end for preventing the formation of a vortex in the liquid adjacent the propeller blades.

26. An apparatus in accordance with claim 25 including a plurality of fins extending radially from the outer surface of said outer housing adjacent its second end, each fin having a distal end, said shield having a curvilinear configuration and an inner surface attached to distal ends of said fins to hold said shield in a spaced relationship from said outer housing, said shield having opposite ends and a lengthwise dimension extending between the ends generally in the direction of the longitudinal dimension of said outer housing and a circumferential dimension extending in an arc less than 360° generally around the longitudinal axis of said inner tube means, one of the ends of said shield extending over said propeller blades.

27. An apparatus in accordance with claim 17 including a plurality of arms extending radially from said outer housing at its first end, said motor means including a motor and a drive shaft extending from said motor, means for attaching said motor to said arms, said drive shaft having an axis substantially in alignment with the axis of said inner tube means, said motor being adapted to rotate said drive shaft about its axis, coupling means drivingly coupling said drive shaft to said inner tube means for transferring the rotary motion of said drive shaft to said inner tube means while permitting universal motion of the first end of said inner tube means.

28. An apparatus in accordance with claim 27 including a motor housing attached to said outer housing adjacent its first end, said motor housing encircling said motor, said motor housing forming an inlet plenum around said motor, inlet apertures formed through said motor housing to allow gas surrounding said motor housing to enter said inlet plenum, said inlet plenum being in communication with the hollow interior of said outer housing and with said inlet means of said inner tube means whereby the gas passing through said inlet plenum is heated by said motor and thereafter enters the hollow interior of said inner tube means.

29. An apparatus in accordance with claim 17, 18 or 24 wherein said inner tube means includes a cylindrical wall aligned along the axis of the inner tube means to within a tolerance of ten thousandths of an inch along its entire length, said cylindrical wall extending along a major portion of the length of said inner tube means, said motor means includes a motor attached to said outer housing adjacent the first end thereof and a drive shaft extending from said motor, and a U-joint drivingly coupling said drive shaft to the first end of said inner tube means while permitting universal motion of the first end of said inner tube means at said coupling.

30. An apparatus in accordance with claim 17 wherein said diffusion section extends a predetermined distance below said propeller blades such that said propeller blades can rotate through a liquid substantially free of gas bubbles injected into the liquid through said air outlet end when the axis of said inner tube means is disposed at an acute angle relative to the horizontal.

* * * * *

UNITED STATES PATENT AND TRADEMARK OFFICE
CERTIFICATE OF CORRECTION

PATENT NO. : 4,240,990

DATED : December 23, 1980

INVENTOR(S) : Harold G. Inhofer and John De Veau

It is certified that error appears in the above—identified patent and that said Letters Patent is hereby corrected as shown below:

In Column 8, line 33, after "attack," cancel the word "pitch";

line 35, after "The" cancel the word "pitch" and insert the word --rake-- in place thereof.

Signed and Sealed this

Eleventh Day of August 1981

[SEAL]

Attest:

Attesting Officer

GERALD J. MOSSINGHOFF

Commissioner of Patents and Trademarks